United States Patent
Eliaz (10) Patent No.: US 8,824,599 B1
(45) Date of Patent: Sep. 2, 2014

(54) PILOT SYMBOL-AIDED SEQUENCE ESTIMATION FOR HIGHLY-SPECTRALLY-EFFICIENT COMMUNICATIONS

(71) Applicant: MagnaCom Ltd., Moshav Ben Shemen (IL)

(72) Inventor: Amir Eliaz, Moshav Ben Shemen (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 13/755,052

(22) Filed: Jan. 31, 2013

Related U.S. Application Data (60) Provisional application No. 61/662,085, filed on Jun. 20, 2012, provisional application No. 61/726,099, filed on Nov. 14, 2012, provisional application No. 61/729,774, filed on Nov. 26, 2012, provisional application No. 61/747,132, filed on Dec. 28, 2012.

(51) Int. Cl.
  *H03D 1/24* (2006.01)
  *H04L 25/03* (2006.01)

(52) U.S. Cl.
  CPC ............................... *H04L 25/03178* (2013.01)
  USPC .......................................................... 375/320

(58) Field of Classification Search
  USPC ................... 375/320, 324, 267, 343
  See application file for complete search history.

(56) References Cited

U.S. PATENT DOCUMENTS

| | | | |
|---|---|---|---|
| 2002/0101840 A1* | 8/2002 | Davidsson et al. | 370/330 |
| 2004/0166887 A1* | 8/2004 | Laroia et al. | 455/522 |
| 2005/0265470 A1* | 12/2005 | Kishigami et al. | 375/267 |
| 2006/0109780 A1* | 5/2006 | Fechtel | 370/203 |
| 2006/0280113 A1* | 12/2006 | Huo | 370/208 |
| 2007/0082692 A1* | 4/2007 | Tirkkonen et al. | 455/522 |
| 2007/0213087 A1* | 9/2007 | Laroia et al. | 455/522 |
| 2008/0049598 A1* | 2/2008 | Ma et al. | 370/208 |
| 2010/0189093 A1* | 7/2010 | Palanki et al. | 370/344 |
| 2013/0022158 A1* | 1/2013 | Panicker et al. | 375/343 |

OTHER PUBLICATIONS

S. Mita, M. Izumita, N. Doi, and Y. Eto, "Automatic equalizer for digital magnetic recording systems" IEEE Trans. Magn., vol. 25, pp. 3672-3674, 1987.

E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.

(Continued)

*Primary Examiner* — Jaison Joseph (74) *Attorney, Agent, or Firm* — McAndrews, Held & Malloy, Ltd.

(57) ABSTRACT

A receiver may be operable to generate, utilizing a sequence estimation process, estimates of transmitted symbols which may comprise information symbols and one or more pilot symbols. For each of the information symbols, a corresponding one of the generated estimates may be selected from a first set of one or more values based on a search. For each of the one or more pilot symbols, a corresponding one of the generated estimates may be selected from a second set of one or more values based on a predetermination. The second set of one or more values may comprise one or more symbol values predetermined as corresponding to the one or more pilot symbols. Each of the values in the second set may comprise a known value in a modulation symbol constellation associated with the information symbols. Power of each of the one or more pilot symbols may be zero power.

21 Claims, 6 Drawing Sheets

(56) References Cited

OTHER PUBLICATIONS

W. E. Ryan and A. Gutierrez, "Performance of adaptive Volterra equalizers on nonlinear magnetic recording channels," IEEE Trans. Magn., vol. 31, pp. 3054-3056, Nov. 1995.

X. Che, "Nonlinearity measurements and write precompensation studies for a PRML recording channel," IEEE Trans. Magn., vol. 31, pp. 3021-3026, Nov. 1995.

O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.

Equalization: The Correction and Analysis of Degraded Signals, White Paper, Agilent Technologies, Ransom Stephens V1.0, Aug. 15, 2005 (12 pages).

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).

Intuitive Guide to Principles of Communications, www.complextoreal.com, Inter Symbol Interference (ISI) and Root-raised Cosine (RRC) filtering, (2002), pp. 1-23 (23 pages).

Chan, N., "Partial Response Signaling with a Maximum Likelihood Sequence Estimation Receiver" (1980). Open Access Dissertations and Theses. Paper 2855, (123 pages).

The Viterbi Algorithm, Ryan, M.S. And Nudd, G.R., Department of Computer Science, Univ. Of Warwick, Coventry, (1993) (17 pages).

R. A. Gibby and J. W. Smith, "Some extensions of Nyquist's telegraph transmission theory," Bell Syst. Tech. J., vol. 44, pp. 1487-1510, Sep. 1965.

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G. D. Forney, Jr., "Maximum-likelihood sequence extimation of digitial sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog•lu and S. U. Qureshi, "Reduced-state sequence estimation with set partitioning and decision feedback," IEEE Trans. Commun., vol. 36, pp. 13-20, Jan. 1988.

W. H. Gerstacker, F. Obernosterer, R. Meyer, and J. B. Huber, "An efficient method for prefilter computation for reduced-state equalization," Proc. Of the 11th IEEE Int. Symp. Personal, Indoor and Mobile Radio Commun. PIMRC, vol. 1, pp. 604-609, London, UK, Sep. 18-21, 2000.

W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.

Joachim Hagenauer and Peter Hoeher, "A Viterbi algorithm with soft-decision outputs and its applications," in Proc. IEEE Global Telecommunications Conference 1989, Dallas, Texas, pp. 1680-1686, Nov. 1989.

* cited by examiner

PILOT SYMBOL-AIDED SEQUENCE ESTIMATION FOR HIGHLY-SPECTRALLY-EFFICIENT COMMUNICATIONS

CROSS-REFERENCE TO RELATED APPLICATIONS/INCORPORATION BY REFERENCE

This patent application makes reference to, claims priority to, and claims benefit from:

U.S. Provisional Patent Application Ser. No. 61/662,085 entitled "Apparatus and Method for Efficient Utilization of Bandwidth" and filed on Jun. 20, 2012;

U.S. Provisional Patent Application Ser. No. 61/726,099 entitled "Modulation Scheme Based on Partial Response" and filed on Nov. 14, 2012;

U.S. Provisional Patent Application Ser. No. 61/729,774 entitled "Modulation Scheme Based on Partial Response" and filed on Nov. 26, 2012; and U.S. Provisional Patent Application Ser. No. 61/747,132 entitled "Modulation Scheme Based on Partial Response" and filed on Dec. 28, 2012.

This application also makes reference to:

U.S. patent application Ser. No. 13/754,964 filed on Jan. 31, 2013 and patented as U.S. Pat. No. 8,582,637;

U.S. patent application Ser. No. 13/754,998 filed on Jan. 31, 2013;

U.S. patent application Ser. No. 13/755,014 filed on Jan. 31, 2013 and patented as U.S. Pat. No. 8,559,496;

U.S. patent application Ser. No. 13/755,043 filed on Jan. 31, 2013 and patented as U.S. Pat. No. 8,605,832; and U.S. patent application Ser. No. 13/756,079 filed on Jan. 31, 2013.

Each of the above stated applications is hereby incorporated herein by reference in its entirety.

FIELD

Certain embodiments of the disclosure relate to communication systems. More specifically, certain embodiments of the disclosure relate to a method and system for pilot symbol-aided sequence estimation for highly-spectrally-efficient communications.

BACKGROUND

Existing communications methods and systems are overly power hungry and/or spectrally inefficient. Complex linear modulation schemes such as, for example, quadrature amplitude modulation (QAM), are used vastly in wireless and non-wireless communications. However, performance of such modulation schemes degrades in the presence of phase noise and non-linear distortion associated with the communication channel. Some of these modulation schemes may perform, for example, 4-5 dB below the Shannon capacity bound in the case of severe phase noise. As higher-order modulation is needed to drive more throughput, the result may be a throughput that is even further away from the Shannon capacity limit. That is, the gap between desired spectral efficiency and actual spectral efficiency may actually increase with increasing QAM order. In addition, higher-order modulation may also be increasingly sensitive to non-linear distortion.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

Aspects of the present disclosure are directed to a method and system for pilot symbol-aided sequence estimation for highly-spectrally-efficient communications, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, a device/module/circuitry/etc. is "operable" to perform a function whenever the device/module/circuitry/etc. comprises the necessary hardware and code (if any is necessary) to perform the function, regardless of whether performance of the function is disabled, or not enabled, by some user-configurable setting.

Certain embodiments of the disclosure can be found in a method and system for pilot symbol-aided sequence estimation for highly-spectrally-efficient communications. In various embodiments of the disclosure, a receiver in a communication system may be operable to generate estimates of transmitted symbols utilizing a sequence estimation process. The transmitted symbols may comprise information symbols and one or more pilot symbols. During the sequence estimation process, for each of the information symbols, a corresponding one of the generated estimates may be selected from a first set of one or more values based on a search, and for each of the one or more pilot symbols, a corresponding one of the generated estimates may be selected from a second set of one or more values based on a predetermination. In this regard, the second set of one or more values may comprise one or more symbol values predetermined as corresponding to the one or more pilot symbols. The one or more pilot symbols may comprise a pseudo random pattern, for example. Each of the values in the second set may comprise a known value in a modulation symbol constellation associated with the information symbols or in other modulation symbol constellation. For example, the first set of one or more values may be values of a quadrature amplitude modulation (QAM) symbol constellation, and the second set of one or more values may be values of a lower order phase shift keying (PSK) symbol constellation.

In an example embodiment of the disclosure, power of each of the one or more pilot symbols may be zero power, for example. In other instances, the transmitted information symbols may be at a first power in instances when the transmitted one or more pilot symbols are at a second power, and the transmitted information symbols may be at a third power in instances when the transmitted one or more pilot symbols are at a forth power, for example. In this regard, the first power, the second power, the third power and the forth power may be based on a tradeoff between phase noise tolerance and additive white Gaussian noise (AWGN) tolerance. The transmitted symbols may comprise, for example, K consecutive pilot symbols every N information symbols, where K and N are each a positive integer. In this regard, for example, the transmitted symbols may comprise two consecutive pilot symbols every forty information symbols. In other instances, the transmitted symbols may comprise at least one information symbol between pilot symbols.

In an example embodiment of the disclosure, a pilot rate of the one or more pilot symbols and a forward error correction (FEC) rate may be adapted in presence of phase noise and AWGN, according to a specified overall rate budget for the pilot rate and the FEC rate. In this regard, the pilot rate may be adapted dynamically based on one or more performance indicators. In an example embodiment of the disclosure, the receiver may be operable to shift a location of search for an estimate of a transmitted symbol, during the sequence estimation process, to be before or after a location holding one of the one or more pilot symbols.

Figure 1:
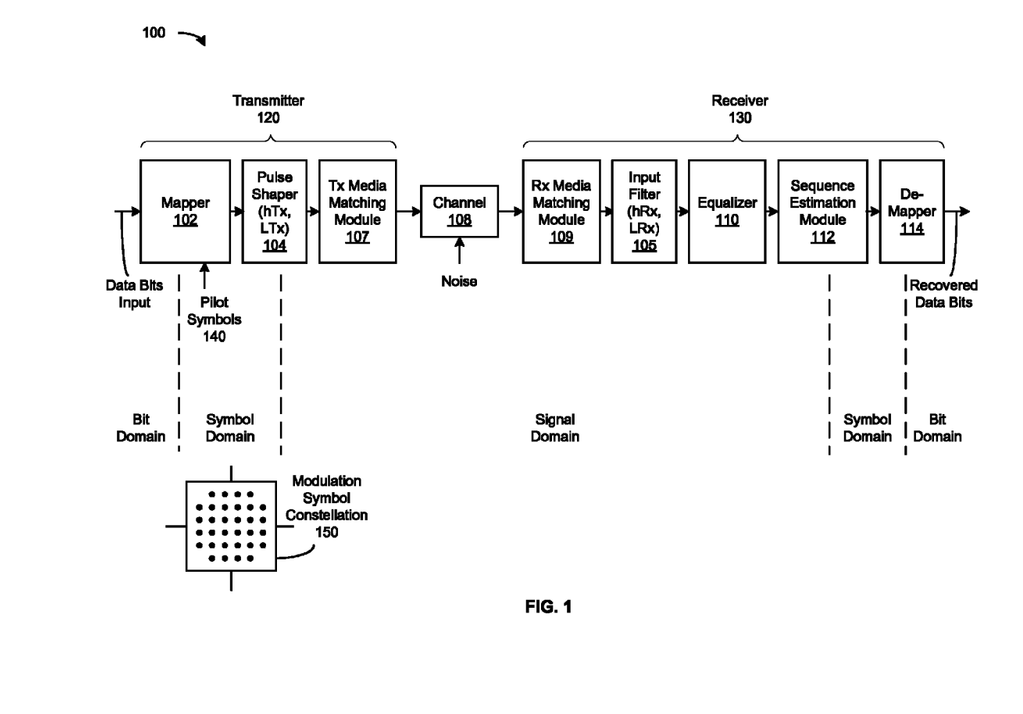
FIG. 1 is a block diagram illustrating an example communication system, in accordance with an embodiment of the disclosure.

FIG. 1 is a block diagram illustrating an example communication system, in accordance with an embodiment of the disclosure. Referring to FIG. 1, there is shown a communication system 100. The communication system 100 may comprise a transmitter 120, a communication channel 108 and a receiver 130. The transmitter 120 may comprise, for example, a mapper 102. The receiver 130 may comprise, for example, a sequence estimation module 112 and a de-mapper 114. A total partial response filtering function may be split between the transmitter 120 and the receiver 130. In this regard, the transmitter 120 may comprise a pulse shaper 104 and the receiver 130 may comprise an input filter 105. The total partial response filtering function may be split between the pulse shaper 104 and the input filter 105. In an example embodiment of the disclosure, other components such as, for example, a forward error correction (FEC) encoder in the transmitter 120, an interleaver in the transmitter 120, a timing recovery module in the receiver 130, a de-interleaver in the receiver 130, and/or a FEC decoder in the receiver 130 may also be optionally included without departing from the spirit and scope of various embodiments of the disclosure. For example, a FEC encoder (not shown) may be included to receive data bits input and generate code words including parity bits or parity words to enable error correction in the receiver 130. Output signals of the FEC encoder may be inputted to the mapper 102, for example. In this regard, a FEC decoder (not shown) may be included, for example, to receive signals from the de-mapper 114 and may be operable to utilize the parity bits or the parity words generated by the FEC encoder to correct bit errors. An overhead of the FEC may be referred to as a FEC code rate or FEC rate.

The mapper 102 may comprise suitable logic, circuitry, interfaces and/or code that may be operable to input data bits and generate symbols according to, for example, a linear modulation scheme such as a quadrature amplitude modulation (QAM). In this regard, an M-QAM modulation scheme may comprise a total of M symbols in a QAM symbol constellation over an I-Q plane (M is a positive integer). For example, 32-QAM may comprise a total of 32 symbols in the 32-QAM symbol constellation. A modulation symbol constellation 150 is also illustrated in FIG. 1. Although M-QAM is used for illustration in this disclosure, aspects of this disclosure are applicable to any modulation scheme (e.g., amplitude shift keying (ASK), phase shift keying (PSK), frequency shift keying (FSK), etc.). Additionally, points of the M-QAM constellation may be regularly spaced ("on-grid") or irregularly spaced ("off-grid"). In an example embodiment of the disclosure, the mapper 102 may be operable to insert one or more pilot symbols 140 (e.g., a particular pattern of pilot symbols 140) into a generated symbol sequence. In an example embodiment, the pilot symbol(s) 140 may be inserted in a deterministic manner (e.g., periodically and/or on an event-driven basis) such that a receiver 130 of the signal may know, or be able to autonomously determine, that the symbols are pilot symbols 140 and not information symbols (information symbols being symbols generated from data bits input to the mapper 102).

The pulse shaper 104 may comprise suitable logic, circuitry, interfaces and/or code that may be operable to adjust the waveform of a signal received from the mapper 102 such that the waveform of a resulting signal complies with the spectral requirements of a communication channel such as the channel 108. The spectral requirements may be referred to as the "spectral mask" and may be established by a regulatory body (e.g., the Federal Communications Commission in the United States or the European Telecommunications Standards Institute) and/or a standard body (e.g., Third Generation Partnership Project) that governs the communication channels and/or standards in use.

The input filter 105 may comprise suitable logic, circuitry, interfaces and/or code that may be operable to adjust the waveform of the signal received via the channel 108 to generate a signal for further processing in the receiver 130.

Each of the pulse shaper 104 and the input filter 105 may comprise, for example, an infinite impulse response (IIR) and/or a finite impulse response (FIR) filter. The number of taps in the pulse shaper 104 is designated LTx and the number of taps in the input filter 105 is designated LRx. The impulse response of the pulse shaper 104 is denoted herein as hTx and the impulse response of the input filter 105 is denoted herein as hTRx.

In an example embodiment of the disclosure, in order to improve tolerance of non-linearity, the pulse shaper 104 and the input filter 105 may be configured such that each of the output signal of the pulse shaper 104 and the output signal of the input filter 105 intentionally has a substantial amount of inter-symbol interference (ISI). In this regard, the ISI is therefore a controlled ISI. Accordingly, the pulse shaper 104 may be referred to as a partial response pulse shaping filter, and the resulting (output) signals of the pulse shaper 104 and the input filter 105 may be referred to as partial response signals or as residing in the partial response domain. The number of the taps and/or the values of the tap coefficients of the input filter 105 may be designed such that it is intentionally non-optimal in terms of noise in order to improve the tolerance of non-linearity. In this regard, the pulse shaper 104 and/or the input filter 105 in the system 100 may offer superior performance in the presence of non-linearity as compared to, for example, a conventional near zero positive ISI pulse shaping filter such as a raised cosine (RC) pulse shaping filter or a root-raised cosine (RRC) pulse shaping filter.

It should be noted that a partial response signal (or signals in the "partial response domain") is just one example of a type of signal for which there is correlation among symbols of the signal (referred to herein as "inter-symbol-correlated (ISC) signals"). Such ISC signals are in contrast to zero (or near-zero) ISI signals generated by, for example, raised-cosine (RC) or root-raised-cosine (RRC) filtering. For simplicity of illustration, this disclosure focuses on partial response signals generated via partial response filtering. Nevertheless, aspects of this disclosure are applicable to other ISC signals such as, for example, signals generated via matrix multiplication (e.g., lattice coding), and signals generated via decimation as in multi carrier applications such as in OFDM systems.

A "total partial response (h)" may be equal to the convolution of hTx and hRx, and, thus, the "total partial response length (L)" may be equal to LTx+LRx−1. L may, however, be chosen to be less than LTx+LRx−1 where, for example, one or more taps of the pulse shaper 104 and/or the input filter 105 are below a determined level. Reducing L may reduce decoding complexity of a sequence estimation process in the receiver 130. This tradeoff may be optimized during the design of the pulse shaper 104 and the input filter 105 in the system 100.

The Tx media matching module 107 may comprise suitable logic, circuitry, interfaces and/or code that may be operable to transform the partial response signal outputted by the pulse shaper 104 to an appropriate signal needed to drive the media in the channel 108. For example, the Tx media matching module 107 may comprise a power amplifier, a radio frequency (RF) up-converter, an optical transceiver for optical application, and/or other transformation device which may be required for propagating over the media.

The Rx media matching module 109 may comprise suitable logic, circuitry, interfaces and/or code that may be operable to convert the signal coming from the media in the channel 108 to baseband signal for processing or demodulating. For example, the Rx media matching module 109 may comprise a power amplifier, a radio frequency (RF) down-converter, an optical transceiver for optical application, and/or other transformation device.

The channel 108 may comprise suitable logic, circuitry, device, interfaces and/or code that may be operable to transmit signals from the transmitter 120 to the receiver 130. The channel 108 may comprise a wired, wireless and/or optical communication medium. The channel 108 may comprise noise such as, for example, additive white Gaussian noise (AWGN). The channel 108 may also introduce distortions such as multipath and fading. In an example embodiment of the disclosure, signals transmitted over the channel 108 may include distortion such as, for example, phase noise and/or non-linear distortion. In this regard, for example, the channel 108 may receive signals from the transmitter 120 via a Tx media matching module 107 which transforms the partial response signal outputted by the pulse shaper 104 to an appropriate signal needed to drive the media in the channel 108. The receiver 130 may receive signals from the channel 108 via an Rx media matching module 109 which converts the signal coming from the media to baseband for demodulating. Both the Tx media matching module 107 and the Rx media matching module 109 may introduce distortion such as phase noise and non-linear distortion (and/or other non-idealities) caused by, for example, limited dynamic range of components. For example, in radio applications, frequency sources may be needed for up-converting the partial response signal outputted by the pulse shaper 104 from baseband to radio frequency (RF). The frequency sources may introduce phase noise which may distort the phase of the modulated signal. Non-linear distortion (e.g., $3^{rd}$ order) may be generated by elements such as, for example, mixers, power amplifiers, variable attenuators and/or baseband analog amplifiers.

The equalizer 110 may comprise suitable logic, circuitry, interfaces and/or code that may be operable to perform equalization functions for the receiver 130. The equalizer 110 may be operable to process a signal received by the equalizer 110 to reduce, for example, ISI caused by the channel 108 between the transmitter 120 and the receiver 130. In an example embodiment of this disclosure, the input signal of the equalizer 110 may be an ISC signal such as a partial response signal received via the channel 108. In this regard, the output signal of the equalizer 110 may be a partial response signal where the ISI left in the output signal may be primarily the result of the pulse shaper 104 and/or the input filter 105 (there may be some residual ISI from multipath, for example, due to use of a least-mean-square (LMS) approach in the equalizer 110). In an example embodiment of the disclosure, the equalizer 110 may be adapted based on an error signal that may be generated in reference to a reconstructed signal (e.g., a reconstructed partial response signal) generated by the sequence estimation module 112.

The sequence estimation module 112 may comprise suitable logic, circuitry, interfaces and/or code that may be operable to perform sequence estimation functions for the receiver 130. The output of the sequence estimation module 112 may be a best estimation as to the value of a corresponding transmitted symbol (and/or the corresponding transmitted information bits) generated by the mapper 102 in the transmitter 120. The estimated values may comprise soft-decision estimates, hard-decision estimates, or both. In an example embodiment of the disclosure, stability of the sequence estimation process, performed by the sequence estimation module 112, may be maintained even at low signal-to-noise ratio (SNR) through use of a pattern of one or more pilot symbols 140 inserted, by the mapper 102, between or among information symbols. When an estimated symbol value corresponding to a transmitted pilot symbol is outputted from the sequence estimation module 112, it may be removed from the estimated signal (e.g., by the de-mapper 114).

The de-mapper 114 may comprise suitable logic, circuitry, interfaces and/or code that may be operable to input estimated symbols from the sequence estimation module 112 and generate recovered data bits according to, for example, a linear modulation scheme such as a M-QAM. Alternatively, or additionally, the de-mapper 114 may generate a soft output for each bit, referred as LLR (Log-Likelihood Ratio). The soft output bits may be used by a soft-decoding forward error corrector (e.g. a low-density parity check (LDPC) decoder). The soft output bits may be generated using, for example, a Soft Output Viterbi Algorithm (SOVA) or similar. Such algorithms may use additional information of the sequence decoding process including metrics levels of dropped paths and/or estimated bit probabilities for generating the LLR, where $$LLR(b) = \log\left(\frac{P_b}{1-P_b}\right),$$

where $P_b$ is the probability that bit b=1.

In operation, the sequence estimation module 112 may be operable to generate estimates of transmitted symbols utilizing a sequence estimation process. The transmitted symbols may be received by the receiver 130 via the channel 108. The transmitted symbols may be generated by the mapper 102. The transmitted symbols may comprise information symbols and one or more pilot symbols 140 which may be inserted by the mapper 102. For each of the information symbols, a corresponding one of the generated estimates may be selected from a first set of one or more values based on a search, and for each of the one or more pilot symbols 140, a corresponding one of the generated estimates may be selected from a second set of one or more values based on a predetermination. The second set of one or more values may comprise one or more symbol values predetermined as corresponding to the one or more pilot symbols 140. In this regard, the pilot symbols 140 may facilitate stability of the sequence estimation process. Because errors in the sequence estimation process may tend to occur in bursts, deterministic pilot symbols 140 may guide the sequence estimation process back to the proper path.

The one or more pilot symbols 140 may comprise, for example, a pseudo random pattern so as to prevent any spurs in the spectral mask. Each of the pilot symbols 140 may correspond to a point in the modulation symbol constellation 150, for example, associated with the information symbols. In this regard, each of the values in the second set may comprise a known value in the modulation symbol constellation 150. In another example implementation, each of the values in the second set may comprise a known value in other modulation symbol constellation. In this regard, for example, the first set of one or more values may be values of a QAM symbol constellation such as the modulation symbol constellation 150, and the second set of one or more values may be values of a lower order PSK (e.g., a quadrature phase shift keying (QPSK) or a binary phase shift keying (BPSK)) symbol constellation. There may be a mechanism, for example, in the sequence estimation module 112 to lock to the frequency of, and track the occurrence of, the pilot symbols 140.

In an example embodiment of the disclosure, a pilot rate (e.g., referred to as the pilot overhead (POH) which may be specified as the percentage of all transmitted symbols that are pilot symbols 140) of the one or more pilot symbols 140 and a FEC rate may be adapted in presence of phase noise and AWGN, according to a specified overall rate budget for the pilot rate and the FEC rate. In this regard, the pilot rate and pattern of the one or more pilot symbols 140 may be adapted dynamically based on one or more performance indicators (e.g., SNR, symbol error rate (SER), bit error rate (BER), metrics levels calculated by the module 112, etc.) associated with the channel 108.

Figure 2A:
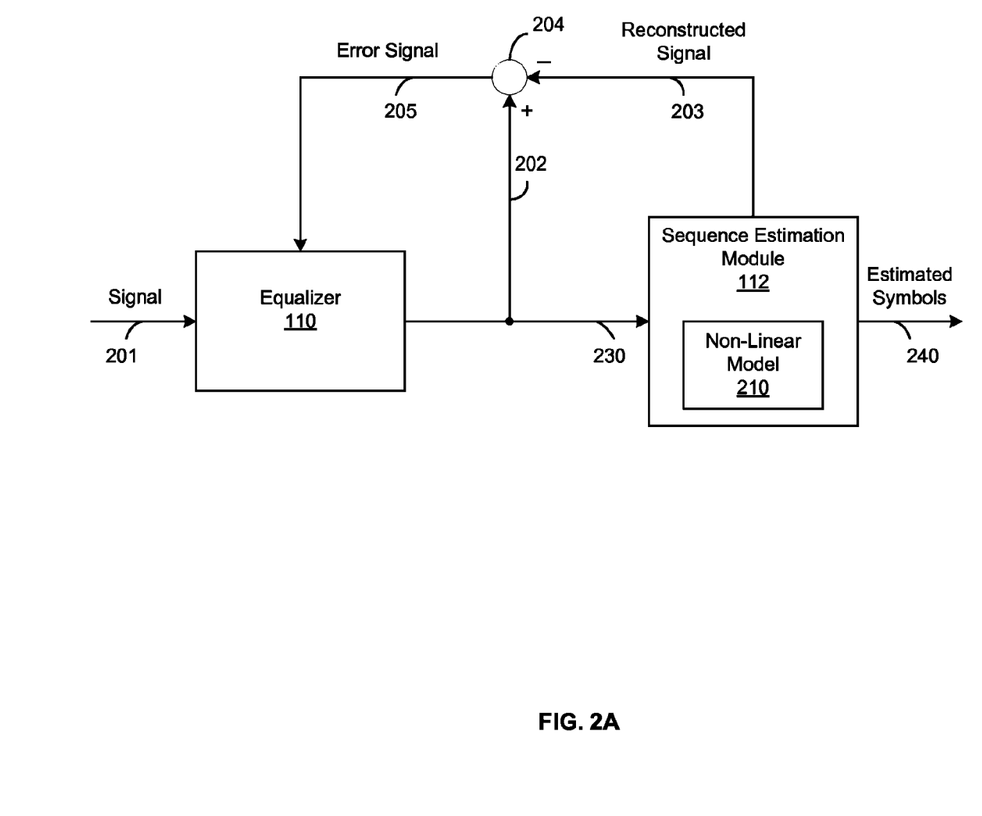
FIG. 2A is a block diagram illustrating an example coupling of an equalizer and a sequence estimation module in a receiver, in accordance with an embodiment of the disclosure.

FIG. 2A is a block diagram illustrating an example coupling of an equalizer and a sequence estimation module in a receiver, in accordance with an embodiment of the disclosure. Referring to FIG. 2A, there is shown the equalizer 110 and the sequence estimation module 112. The sequence estimation module 112 may incorporate a non-linear model 210 in a sequence estimation process. The equalizer 110 and the sequence estimation module 112 may be as described with respect to FIG. 1, for example.

In the exemplary embodiment of the disclosure illustrated in FIG. 2A, although the equalizer 110 and the sequence estimation module 112 are shown, the disclosure may not be so limited. Other modules (or circuits) such as, for example, a carrier recovery module, a phase adjust module and/or other similar modules may also be optionally included in FIG. 2A without departing from the spirit and scope of various embodiments of the disclosure. For example, the carrier recovery module and/or the phase adjust module may be included for various phase correction or recovery throughout the equalization process and/or the sequence estimation process.

The non-linear model 210 may comprise, for example, a saturated third order polynomial which may be expressed as $$y = \begin{cases} x \cdot (1 - r \cdot e^{j\varphi} \cdot |x|^2), & x < x_{sat} \\ y_{sat}, & x \geq x_{sat} \end{cases} \quad [1]$$

$$y_{sat} = x_{sat} \cdot (1 - r \cdot e^{j\varphi} \cdot |x_{sat}|^2)$$

where, $x_{sat}$ denotes the input saturation value, $y_{sat}$ denotes the output saturation value, x denotes an input of a non-linear device (or group of devices), y denotes an output of the non-linear device (or group of devices), and γ may be set according to a desired distortion level (backoff). For example, the non-linear device may be a power amplifier in the Tx media matching module 107. In this regard, the x in equation [1] may denote an input power level of the power amplifier and the y may denote an output power level of the power amplifier. Increased accuracy resulting from the use of a higher-order polynomial for the non-linear model 210 may tradeoff with increased complexity of implementing a higher-order polynomial. As transmitter's non-linearity may be the dominant non-linearity of the communication system 100, modeling the transmitter's non-linearity may be sufficient. In instances where degradation in a receiver's performance is above a certain threshold due to other non-linearities in the system (e.g., non-linearity of the Rx media matching module 109), the non-linear model 210 may take into account such other non-linearities. Equation 1 represents just one example of a non-linearity model that may be used by the module 112 in one or more embodiments of the disclosure.

In an example operation, the equalizer 110 may be operable to process or equalize a signal 201 to reduce, for example, ISI caused by the channel 108. The equalizer adaptation may be based on, for example, a LMS algorithm. An error signal 205 is fed back to the equalizer 110 to drive the adaptive equalizer 110. The reference for generating the error signal 205 may be, for example, a reconstructed signal 203 coming from the sequence estimation module 112. In an example embodiment of the disclosure, the signal 201 may be an ISC signal such as a partial response signal. In this regard, the reconstructed signal 203 may be a reconstructed partial response signal. The error signal 205 is the difference, calculated by a combiner 204, between an output signal 202 of the equalizer 110 and the reconstructed signal 203. Generation of the reconstructed signal 203 may incorporate the non-linear model 210 of the signal 201 and is described below with reference to FIG. 2B. An equalized signal 230 may be inputted to the sequence estimation module 112. The sequence estimation module 112 may be operable to generate symbols (estimated symbols) 240, from the signal 230, using the sequence estimation process. The generated symbols 240 may be hard and/or soft estimates of transmitted symbols generated by the mapper 102 in the transmitter 120. An example implementation of the sequence estimation module 112 is described below with reference to FIG. 2B.

Figure 2B:
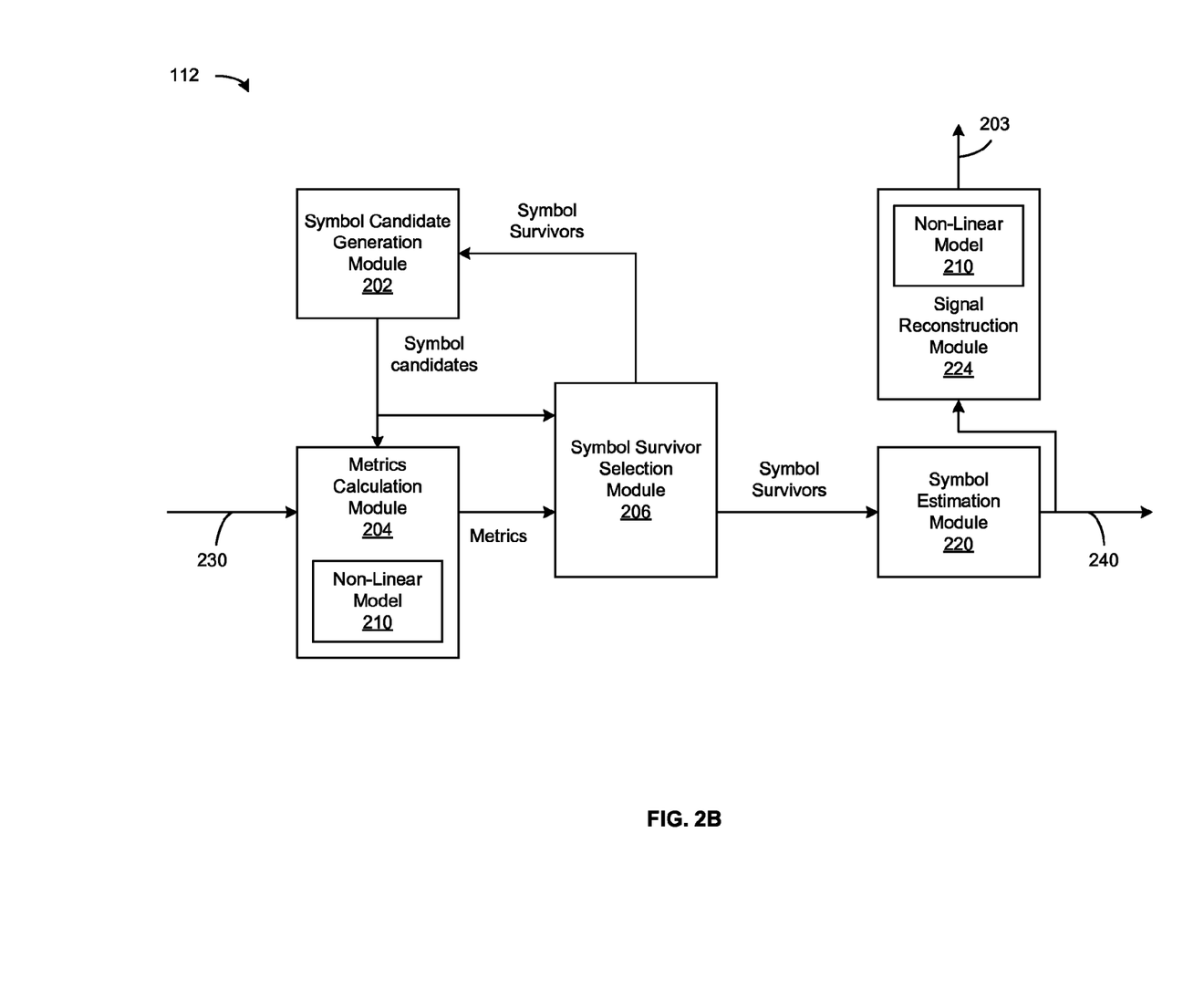
FIG. 2B is a block diagram illustrating an example sequence estimation module in a receiver, in accordance with an embodiment of the disclosure.

FIG. 2B is a block diagram illustrating an example sequence estimation module in a receiver, in accordance with an embodiment of the disclosure. Referring to FIG. 2B, there is shown the sequence estimation module 112. The sequence estimation module 112 may comprise, for example, a symbol candidate generation module 202, a metrics calculation module 204, a symbol survivor selection module 206, a symbol estimation module 220 and a signal reconstruction module 224. The sequence estimation process described with respect to FIG. 2B is an example only. Many variations of the sequence estimation process may also be possible. The sequence estimation module 112 may be as described with respect to FIGS. 1 and 2A, for example.

The metrics calculation module 204 may comprise suitable logic, circuitry, interfaces and/or code that may be operable to generate metrics needed for symbol survivor selections and symbol (including corresponding phase) estimations. Metrics calculations may be executed based on a signal 230 received by the metrics calculation module 204 and symbol candidates generated by the symbol generation module 202. Each symbol candidate may be a vector comprising, for example, Q candidate symbols (Q is a positive integer). Information associated with the taps of the pulse shaper 104 and/or the input filter 105 may also be utilized for the metrics calculation. In an example embodiment of the disclosure, the signal 230 may be an ISC signal such as a partial response signal received from the input filter 105. The taps information (e.g., number of taps and/or tap coefficients) associated with the pulse shaper 104 and/or the input filter 105 may be used to generate reconstructed partial response signal candidates from the symbol candidates, for example, via convolution. The taps information associated with the pulse shaper 104 and/or the input filter 105 may be presented, for example, in the form of L (where $LTx<=L<=(LTx+LRx-1)$) tap coefficients corresponding to the total partial response h, according to the LTx tap coefficients of the pulse shaper 104 and the LRx tap coefficients of the input filter 105. Furthermore the non-linear model 210 may be incorporated in the process of generating the reconstructed partial response signal candidates. For example, the non-linear model 210 may be applied to the convolved symbol candidates to generate the reconstructed partial response signal candidates. The metric value for each of the symbol candidates may then be generated based on a cost function (e.g., a squared error function) between the signal 230 and the reconstructed partial response signal candidates. The candidates which have the best metrics level may be selected by the symbol survivor selection module 206 for the next iteration of the sequence estimation process.

The symbol survivor selection module 206 may comprise suitable logic, circuitry, interfaces and/or code that may be operable to perform metrics sorting and selection of a determined number of symbol survivors based on the metrics associated with the symbol candidates. In this regard, for example, one or more candidates which have the lowest metrics level may be selected, from among the symbol candidates, as symbol survivors. Each symbol survivor may also be a vector comprising, for example, Q candidate symbols (Q is a positive integer). Each element of each symbol survivor may comprise a soft-decision estimate and/or a hard-decision estimate of a symbol of the signal 230. Besides a newly-detected symbol at a head of the vector, there are (Q−1) symbols in the vector. Some of the (Q−1) symbols could be different than corresponding symbols in a previously-selected symbol survivor (i.e. the sequence estimation may diverge to a different vector). The reliability of the newly-detected symbol may be very low because it may be derived only from the newest signal sample and a first tap of the L taps associated with the pulse shaper 104 and/or the input filter 105, which may have a coefficient that is small in magnitude. The reliability of old symbols toward a tail of the vector may improve along the survived vectors because old symbols are represented by many signal samples (up to effective number of the taps of the total partial response) and thus take advantage of more information. In this regard, the tails (old symbols) of the symbol survivors may converge to the same solution while the head (young symbols) parts of the symbol survivors may be different.

The symbol candidate generation module 202 may comprise suitable logic, circuitry, interfaces and/or code that may be operable to generate symbol candidates from symbol survivors generated from a previous iteration of the sequence estimation process. For example, for M-OAM (M is a positive integer), there are M symbols in the M-QAM symbol constellation (e.g., the modulation symbol constellation 150) over an I-Q plane. In this regard, generation of the symbol candidates may comprise, for example, duplicating (e.g., (M−1) times) each of the symbol survivors (vectors) generated during the previous iteration of the sequence estimation process, shifting each of the resulting M vectors by one symbol position toward the tail of the vector, and then filling each of the M vacant symbol positions (at the head of the vector) with a symbol from among the M possible symbols in the M-QAM symbol constellation (e.g., the modulation symbol constellation 150). In an example embodiment of the disclosure, the symbol candidate generation module 202 may be operable to eliminate search for an estimated symbol at a time when one of the pilot symbols 140 reaches a search location (i.e., when the symbol for which candidates are to be generated is a pilot symbol). That is, the estimated symbol at the search location may simply be determined to be the deterministic pilot symbol. In such instances, each of the symbol survivors (vectors) generated from the previous selection iteration may simply be shifted by one symbol position toward the tail of the vector, and the vacant symbol position may be filled with the one known pilot symbol. In an alternate implementation, a location of search (i.e., the element of the symbol candidate for which the metric is calculated) for an estimate of a transmitted symbol may be shifted, by the symbol candidate generation module 202, to be before or after a location holding one of the one or more pilot symbols 140. In such an alternate implementation, the number of candidates generated by the symbol candidate generation module 202 may be the same number of candidates as when the search is performed on the default location (the location now occupied by a pilot symbol). In this manner, shifting the search location to before the pilot symbols 140 may provide an opportunity to restore a good symbol survivor (e.g., symbol survivor with a metric below a threshold) that had been discarded in a previous iteration of the sequence estimation.

The symbol estimation module 220 may comprise suitable logic, circuitry, interfaces and/or code that may be operable to generate symbols (estimated symbols) 240 based on the symbol survivors received from the symbol survivor selection module 206. The generated symbols 240 may be estimates of transmitted symbols generated by the mapper 102 in the transmitter 120. In an example embodiment of the disclosure, the symbol estimation module 220 may be operable to generate the estimated symbols 240 based on a best symbol survivor with the lowest metric value. The symbol estimation module 220 may comprise one or more buffers to store one or more symbol survivors.

The signal reconstruction module 224 may comprise suitable logic, circuitry, interfaces and/or code that may be operable to generate the reconstructed signal 203. In an example embodiment of the disclosure, the signal 230 may be an equalized ISC signal such as a partial response signal received from the equalizer 110. The taps information associated with the pulse shaper 104 and/or the input filter 105 (e.g., the L tap coefficients) may be used to generate the reconstructed signal (partial response signal) 203 from the estimated symbols 240, for example, via convolution. In this regard, for example, the non-linear model 210 may be incorporated in the process of generating the reconstructed signal (partial response signal) 203. For example, the non-linear model 210 may be applied to the convolved symbols to generate the reconstructed signal (partial response signal) 203.

In operation, the metrics calculation module 204 may be operable to receive, via the channel 108, the signal 230. The estimates (the estimated symbols 240) of transmitted symbols in the signal 230 may be generated by the sequence estimation module 112 utilizing a sequence estimation process. In this regard, the sequence estimation process may be performed by the metrics calculation module 204, the symbol candidate generation module 202, the symbol survivor selection module 206 and the symbol estimation module 220. The sequence estimation module 112 may be operable to maintain stability of the sequence estimation process based on the one or more pilot symbols 140. In this regard, for each of the information symbols, a corresponding one of the generated estimates may be selected from a first set of one or more values based on a symbol value search (performed by the symbol candidate generation module 202, the metrics calculation module 204 and the symbol survivor selection module 206). On the other hand, for each of the one or more pilot symbols 140, a corresponding one of the generated estimates may be selected from a second set of one or more values based on a predetermination. In this regard, for example, the symbol candidate generation module 202 may be operable to eliminate search for an estimated symbol at a time when one of the pilot symbols 140 reaches a search location. The estimated symbol at the search location may then be determined, for example, by the symbol candidate generation module 202, to be the known (predetermined) pilot symbol that reaches the search location, without need for candidate generation, etc. This may free-up resources of the sequence estimation module 112 to estimate the value of other symbols, and/or may allow time to perform an iterative process. For example, during an iteration of the sequence estimation process in which the most recently received symbol is a pilot symbol, the sequence estimation module 112 may perform a second estimation of a previous symbol whose metrics might be low (e.g., lower than a threshold and/or lower than metrics for other recently received symbols). This insertion of the pilot symbols 140 may also improve the sequence estimation reliability for other symbols because there may be less unknown symbols to estimate. Thus insertion of the pilot symbols 140 may improve noise (e.g., AWGN) tolerance and bit error rate (BER) performance. When the sequence estimation process is unstable and generates a long error burst or goes out of convergence, the pattern of pilot symbols 140 may be able to stop the error burst and may guide the sequence estimation process back to a stable state.

Alternately, the symbol candidate generation module 202 may be operable to shift a location of search for an estimate of a transmitted symbol to be before or after a location holding one of the one or more pilot symbols 140. Such an alternate implementation may provide an opportunity to restore a good symbol survivor that had been discarded in a previous iteration of the sequence estimation.

The transmitted symbols may comprise, for example, K consecutive pilot symbols 140 every N information symbols (K and N are each a positive integer). For example, the transmitted symbols may comprise two consecutive pilot symbols 140 every forty information symbols. In other instances, the transmitted symbols may comprise, for example, at least one information symbol between pilot symbols 140.

Figure 3:
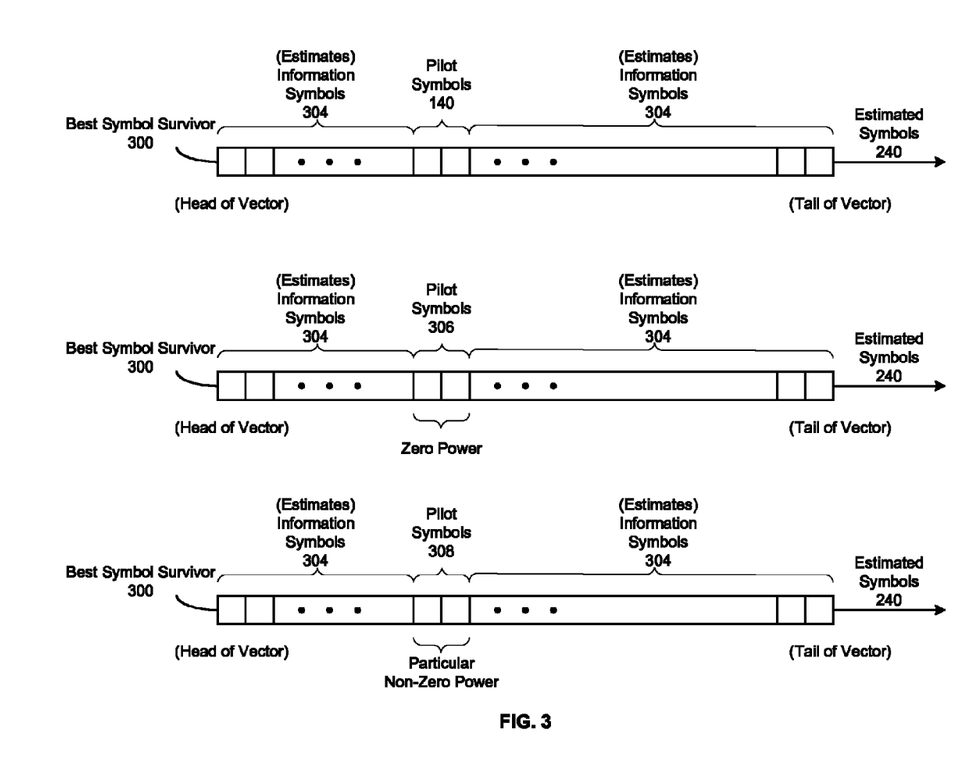
FIG. 3 is a diagram illustrating example pilot symbols, in accordance with an embodiment of the disclosure.

FIG. 3 is a diagram illustrating example pilot symbols, in accordance with an embodiment of the disclosure. Referring to FIG. 3, there is shown a best symbol survivor 300. The best symbol survivor 300 may comprise a plurality of information symbols 304 and a pattern of pilot symbols 140. The length of the best symbol survivor 330 may be determined or designed, for example, based on the total partial response length L (where $LTx<=L<=(LTx+LRx-1)$). For example, the length of the best symbol survivor 300 may be five times the length of the total partial response length L. There is also shown in FIG. 3 a best symbol survivor 300 comprising a pattern of pilot symbols 306 each configured to comprise zero power. There is also shown in FIG. 3 a best symbol survivor 300 comprising a pattern of pilot symbols 308 each configured to comprise a particular, non-zero power.

In an example operation, the estimated symbols 240 (estimates of transmitted symbols) may be generated, by the symbol estimation module 220, based on the best symbol survivor 300 generated in a sequence estimation process. The transmitted symbols may comprise information symbols 304 and a pattern of pilot symbols 104. In this regard, the best symbol survivor 300 may comprise a pattern of pilot symbols 140 and estimates of a plurality of information symbols 304. In an example embodiment of the disclosure, due to the convolution nature of the sequence estimation process for partial response modulated signals, it may be more effective to insert K consecutive pilot symbols 140 every N information symbols 304 (K and N are each a positive integer) generated and transmitted by the mapper 104. In this regard, the pilot symbols 140 may appear in the best symbol survivor 300 such that there are K consecutive pilot symbols 140 every N information symbols 304 (e.g., two consecutive pilot symbols 140 every forty information symbols 304).

The pilot symbols may be configurable. For example, power of each of the pilot symbols 306 may be zero power. In such instances, although the pilot symbols 306 may each comprise zero power, they may still possess information for the sequence estimation process and the sequence estimation may instead be utilized for determining or estimating the information symbols 304 (non-pilot symbols). In other instances, the pilot symbols such as the pilot symbols 308 may each comprise a particular, non-zero power based on a tradeoff between a tolerance level of AWGN and a tolerance level of phase noise in the transmitted symbols. In this regard, with the presence of zero-power pilot symbols 306, the power of each of the information symbols 304 may be increased comparing to the case with no pilot symbols or the case with non-zero-power pilot symbols 308. That is, because communication standards typically dictate a maximum average power, use of zero-power pilot symbols 306 that do not contribute to the average power, enables information symbols to be slightly higher power and still remain within the applicable average power limit determined by a spectral mask and/or communications standard with which the transmitter 120 is to comply.

Non-zero-power pilot symbols 308 may consume power from the information symbols 304 (non-pilot symbols), but may be more effective in some instances such as, for example, in the presence of severe phase noise. For example, the transmitter 120 may measure phase noise, and/or receive a measurement of phase noise from the receiver 130, and may select the power of the pilot symbols 140 accordingly (e.g., phase noise below a threshold may result in use of zero-power pilot symbols 360 and phase noise above (and in some embodiments, or equal to) the threshold may result in use of non-zero-power pilot symbols 308). Therefore, the pilot symbol power may be a tradeoff between tolerance level of phase noise and tolerance level of AWGN (i.e., higher-power pilot symbols 308 may result in better phase noise tolerance but also necessitate lower power for information symbols 304, which may result in less tolerance of AWGN). Therefore, based on a tradeoff between phase noise tolerance and AWGN tolerance, and within the applicable average power limit, the information symbol 304 may be at a first power in instances when the pilot symbols 308 are at a second power, and the information symbol 304 may be at a third power in instances when the pilot symbols 308 are at a forth power.

Figure 4:
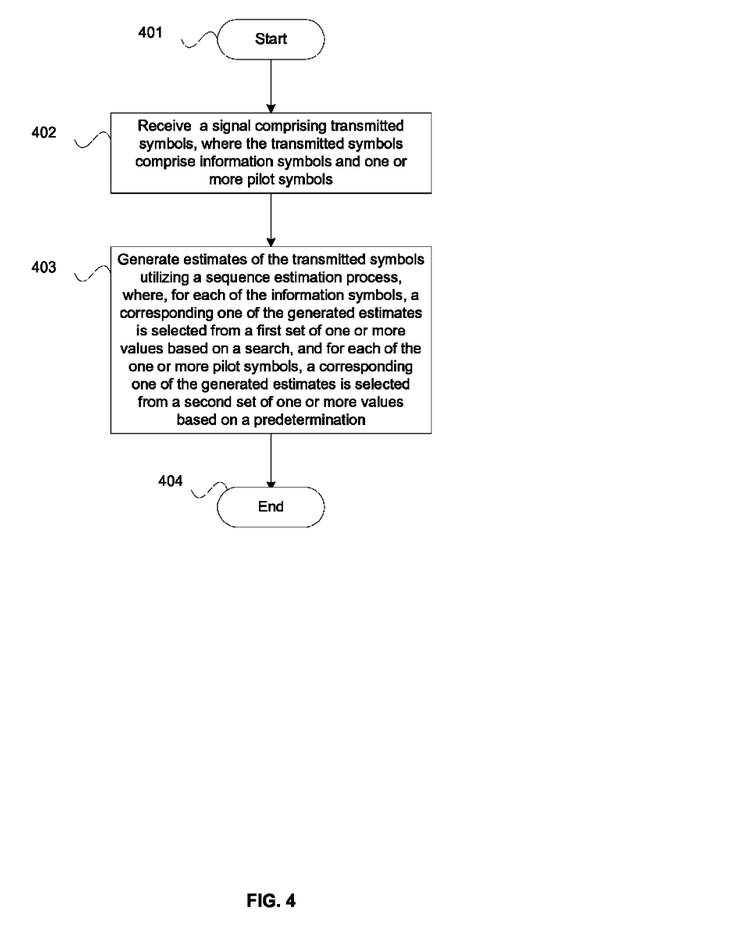
FIG. 4 is a flow chart illustrating example steps for pilot symbol-aided sequence estimation for highly-spectrally-efficient communications, in accordance with an embodiment of the disclosure.

FIG. 4 is a flow chart illustrating example steps for pilot symbol-aided sequence estimation for highly-spectrally-efficient communications, in accordance with an embodiment of the disclosure. Referring to FIG. 4, the example steps start at step 401. In step 402, the sequence estimation module 112 in the receiver 130 may be operable to receive a signal 230 comprising transmitted symbols. The transmitted symbols generated by the mapper 102 may comprise information symbols 304 and one or more pilot symbols 140. In step 403, the sequence estimation module 112 may be operable to generate estimates (estimated symbols 240) of the transmitted symbols utilizing a sequence estimation process. The sequence estimation process may be performed by the metric calculation module 204, the symbol survivor selection module 206, the symbol candidate generation module 202 and the symbol estimation module 220, in the sequence estimation module 112. During the sequence estimation process, for each of the information symbols 304, a corresponding one of the generated estimates (estimated symbols 240) may be selected from a first set of one or more values based on a search, and for each of the one or more pilot symbols 140, a corresponding one of the generated estimates (estimated symbols 240) may be selected from a second set of one or more values based on a predetermination. The example steps may proceed to the end step 404.

Figure 5:
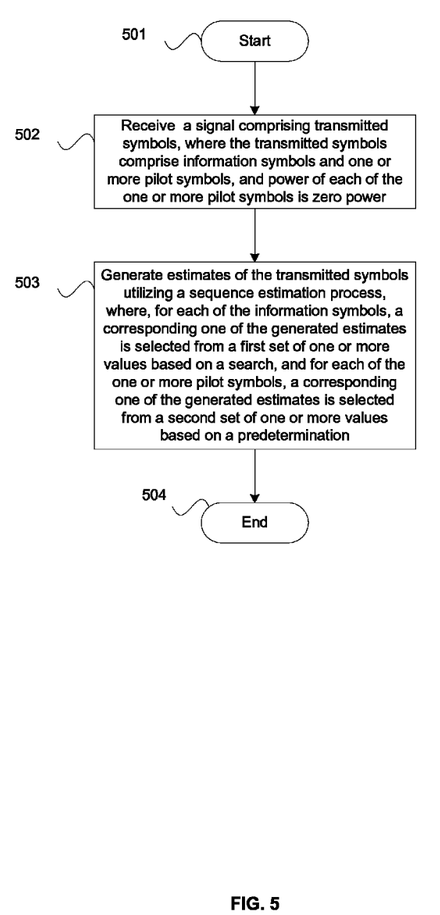
FIG. 5 is a flow chart illustrating example steps for zero-power pilot symbol-aided sequence estimation for highly-spectrally-efficient communications, in accordance with an embodiment of the disclosure.

FIG. 5 is a flow chart illustrating example steps for zero-power pilot symbol-aided sequence estimation for highly-spectrally-efficient communications, in accordance with an embodiment of the disclosure. Referring to FIG. 5, the example steps start at step 501. In step 502, the sequence estimation module 112 in the receiver 130 may be operable to receive a signal 230 comprising transmitted symbols. The transmitted symbols generated by the mapper 102 may comprise information symbols 304 and one or more pilot symbols 140, and power of each of the one or more pilot symbols 140 may be zero power. In step 503, the sequence estimation module 112 may be operable to generate estimates (estimated symbols 240) of the transmitted symbols utilizing a sequence estimation process. The sequence estimation process may be performed by the metric calculation module 204, the symbol survivor selection module 206, the symbol candidate generation module 202 and the symbol estimation module 220, in the sequence estimation module 112. During the sequence estimation process, for each of the information symbols 304, a corresponding one of the generated estimates (estimated symbols 240) may be selected from a first set of one or more values based on a search, and for each of the one or more pilot symbols 140, a corresponding one of the generated estimates (estimated symbols 240) may be selected from a second set of one or more values based on a predetermination. The example steps may proceed to the end step 504.

In various embodiments of the disclosure, a sequence estimation module 112 in a receiver 130 may be operable to generate estimates (estimated symbols 240) of transmitted symbols utilizing a sequence estimation process. The sequence estimation may be performed, for example, by a metric calculation module 204, a symbol survivor selection module 206, a symbol candidate generation module 202 and a symbol estimation module 220, in the sequence estimation module 112. During the sequence estimation process, for each of the information symbols 304, a corresponding one of the generated estimates (estimated symbols 240) may be selected from a first set of one or more values based on a search, and for each of the one or more pilot symbols 140, a corresponding one of the generated estimates (estimated symbols 240) may be selected from a second set of one or more values based on a predetermination. In this regard, the second set of one or more values may comprise one or more symbol values predetermined as corresponding to the one or more pilot symbols 140. The one or more pilot symbols 140 may comprise a pseudo random pattern, for example. Each of the values in the second set may comprise a known value in a modulation symbol constellation 150 associated with the information symbols 304 or in other modulation symbol constellation. For example, the first set of one or more values may be values of a QAM symbol constellation such as the modulation symbol constellation 150, and the second set of one or more values may be values of a lower order PSK (e.g., a QPSK or a BPSK) symbol constellation.

In some instances, power of each of the one or more pilot symbols 306 may be zero power, for example. In other instances, the transmitted information symbols 304 may be at a first power in instances when the transmitted one or more pilot symbols 308 are at a second power, and the transmitted information symbols 304 may be at a third power in instances when the transmitted one or more pilot symbols 308 are at a forth power, for example. In this regard, the first power, the second power, the third power and the forth power may be based on a tradeoff between phase noise tolerance and AWGN tolerance. The transmitted symbols may comprise, for example, K consecutive pilot symbols 140 every N information symbols 304, where K and N are each a positive integer. In this regard, for example, the transmitted symbols may comprise two consecutive pilot symbols 140 every forty information symbols 304. In other instances, the transmitted symbols may comprise at least one information symbol between pilot symbols 140.

A pilot rate of the one or more pilot symbols 140 and a FEC rate may be adapted in presence of phase noise and AWGN, according to a specified overall rate budget for the pilot rate and the FEC rate. In this regard, the pilot rate may be adapted dynamically based on one or more performance indicators (e.g., SNR, SER, BER, metrics levels calculated by the metrics calculation module 204, etc.). The symbol candidate generation module 202 may be operable to shift a location of search for an estimate (estimated symbol 240) of a transmitted symbol, during the sequence estimation process, to be before or after a location holding one of the one or more pilot symbols 140.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for pilot symbol-aided sequence estimation for highly-spectrally-efficient communications.

Accordingly, aspects of the present disclosure may be realized in hardware, software, or a combination of hardware and software. Aspects of the present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method comprising:
   in a receiver:
   generating, utilizing a sequence estimation process, estimates of transmitted symbols which comprise information symbols and one or more pilot symbols, wherein:
   for each of the information symbols, a corresponding one of the generated estimates is selected from a first set of one or more values based on a search;
   each of the values in the first set comprises a value in a first modulation symbol constellation associated with the information symbols;
   for each of the one or more pilot symbols, a corresponding one of the generated estimates is selected from a second set of one or more values based on a predetermination;
   each of the values in the second set comprises a value in a second modulation symbol constellation not associated with the information symbols; and
   receiving the one or more pilot symbols at a pilot rate and a forward error correction (FEC) rate that adapts in presence of phase noise and AWGN according to a specified overall rate budget for the pilot rate and the FEC rate.

2. The method according to claim 1, wherein the second set of one or more values comprises one or more symbol values predetermined as corresponding to the one or more pilot symbols.

3. The method according to claim 1, wherein the one or more pilot symbols comprises a pseudo random pattern.

4. The method according to claim 1, wherein the first set of one or more values are values of a quadrature amplitude modulation (QAM) symbol constellation, and the second set of one or more values are values of a lower order phase shift keying (PSK) symbol constellation.

5. The method according to claim 1, wherein power of each of the one or more pilot symbols is zero power.

6. The method according to claim 1, comprising receiving the information symbols and the one or more pilot symbols, wherein:
   the received information symbols were transmitted at a first power when the received one or more pilot symbols were transmitted at a second power; and
   the received information symbols were transmitted at a third power when the received one or more pilot symbols were transmitted at a fourth power.

7. The method according to claim 6, wherein the first power, the second power, the third power, and the fourth power are based on a tradeoff between phase noise tolerance and additive white Gaussian noise (AWGN) tolerance.

8. The method according to claim 1, wherein the transmitted symbols comprise K consecutive pilot symbols every N information symbols, where K and N are each a positive integer greater than 1.

9. The method according to claim 1, wherein the transmitted symbols comprise at least one information symbol between pilot symbols.

10. The method according to claim 1, wherein the pilot rate adapts dynamically based on one or more performance indicators.

11. The method according to claim 1, comprising, during the sequence estimation process:
    when a first location within a symbol candidate vector contains one of said information symbols, estimating a value of said one of said information symbols at said first location within said symbol candidate vector; and
    when said first location within said symbol candidate vector contains one of said pilot symbols, estimating a value of one of said information symbols at a second location within said symbol candidate vector, said second location being before or after said first location.

12. A system comprising:
    a receiver, the receiver being operable to:
    generate, utilizing a sequence estimation process, estimates of transmitted symbols which comprise information symbols and one or more pilot symbols, wherein:
    for each of the information symbols, a corresponding one of the generated estimates is selected from a first set of one or more values based on a search;
    each of the values in the first set comprises a value in a first modulation symbol constellation associated with the information symbols;
    for each of the one or more pilot symbols, a corresponding one of the generated estimates is selected from a second set of one or more values based on a predetermination; and
    each of the values in the second set comprises a value in a second modulation symbol constellation not associated with the information symbols, wherein power of each of the one or more pilot symbols is zero power.

13. The system according to claim 12, wherein the second set of one or more values comprises one or more symbol values predetermined as corresponding to the one or more pilot symbols.

14. The system according to claim 12, wherein:
    the receiver is operable to receive the information symbols and the one or more pilot symbols;

the received information symbols were transmitted at a first power when the received one or more pilot symbols were transmitted at a second power; and the received information symbols were transmitted at a third power when the received one or more pilot symbols were transmitted at a fourth power.

15. The system according to claim 14, wherein the first power, the second power, the third power, and the fourth power are based on a tradeoff between phase noise tolerance and additive white Gaussian noise (AWGN) tolerance.

16. The system according to claim 12, wherein the receiver is operable, during the sequence estimation process to:
  when a first location within a symbol candidate vector contains one of said information symbols, estimate a value of said one of said information symbols at said first location within said symbol candidate vector; and
  when said first location within said symbol candidate vector contains one of said pilot symbols, estimate a value of one of said information symbols at a second location within said symbol candidate vector, said second location being before or after said first location.

17. A method comprising:
  in a receiver:
    generating, utilizing a sequence estimation process, estimates of transmitted symbols which comprise information symbols and one or more pilot symbols, wherein:
      for each of the information symbols, a corresponding one of the generated estimates is selected from a first set of one or more values based on a search;
      each of the values in the first set comprises a value in a first modulation symbol constellation associated with the information symbols;
      for each of the one or more pilot symbols, a corresponding one of the generated estimates is selected from a second set of one or more values based on a predetermination;
      each of the values in the second set comprises a value in a second modulation symbol constellation not associated with the information symbols;
      the sequence estimation process comprises:
        estimating a value of said one of said information symbols at a first location within said symbol candidate vector when said first location within a symbol candidate vector contains one of said information symbols; and
        estimating a value of one of said information symbols at a second location within said symbol candidate vector when said first location within said symbol candidate vector contains one of said pilot symbols;
      said second location is before or after said first location; and
      said first location within said symbol candidate vector corresponds to a first symbol more-recently received than a second symbol and said second location within said symbol candidate vector corresponds to said second symbol less-recently received than said first symbol.

18. A system comprising:
  a receiver, the receiver being operable to:
    generate, utilizing a sequence estimation process, estimates of transmitted symbols which comprise information symbols and one or more pilot symbols, wherein:
      for each of the information symbols, a corresponding one of the generated estimates is selected from a first set of one or more values based on a search;
      each of the values in the first set comprises a value in a first modulation symbol constellation associated with the information symbols;
      for each of the one or more pilot symbols, a corresponding one of the generated estimates is selected from a second set of one or more values based on a predetermination;
      each of the values in the second set comprises a value in a second modulation symbol constellation not associated with the information symbols;
      as part of the sequence estimation process, the receiver is operable to:
        estimate a value of said one of said information symbols at a first location within said symbol candidate vector when said first location within a symbol candidate vector contains one of said information symbols; and
        estimate a value of one of said information symbols at a second location within said symbol candidate vector when said first location within said symbol candidate vector contains one of said pilot symbols;
      said second location being before or after said first location; and
      a first position within said symbol candidate vector corresponds to a first symbol more-recently received than a second symbol, and a second position within said symbol candidate vector corresponds to said second symbol less-recently received than said first symbol.

19. A method, comprising:
  in a receiver:
    generating, utilizing a sequence estimation process, estimates of transmitted symbols which comprise information symbols and one or more pilot symbols, wherein:
      for each of the information symbols, a corresponding one of the generated estimates is selected from a first set of one or more values based on a search;
      for each of the one or more pilot symbols, a corresponding one of the generated estimates is selected from a second set of one or more values based on a predetermination;
    estimating, during the sequence estimation process when a first location within a symbol candidate vector contains one of said information symbols, a value of said one of said information symbols at said first location within said symbol candidate vector;
    estimating, during the sequence estimation process when said first location within said symbol candidate vector contains one of said pilot symbols, a value of one of said information symbols at a second location within said symbol candidate vector, said second location being before or after said first location; and
    wherein a first position within said symbol candidate vector corresponds to a first symbol more-recently received than a second symbol and a second position within said symbol candidate vector corresponds to said second symbol less-recently received than said first symbol.

20. A system, comprising:
  a receiver, the receiver being operable to:
    generate, utilizing a sequence estimation process, estimates of transmitted symbols which comprise information symbols and one or more pilot symbols, wherein:
      for each of the information symbols, a corresponding one of the generated estimates is selected from a first set of one or more values based on a search; and for each of the one or more pilot symbols, a corresponding one of the generated estimates is selected from a second set of one or more values based on a predetermination;

estimate, during the sequence estimation process when a first location within a symbol candidate vector contains one of said information symbols, a value of said one of said information symbols at said first location within said symbol candidate vector; and estimate, during the sequence estimation process when said first location within said symbol candidate vector contains one of said pilot symbols, a value of one of said information symbols at a second location within said symbol candidate vector, said second location being before or after said first location;

wherein a first position within said symbol candidate vector corresponds to a first symbol more-recently received than a second symbol, and a second position within said symbol candidate vector corresponds to said second symbol less-recently received than said first symbol.

21. The system according to claim 12, wherein the first set of one or more values are values of a quadrature amplitude modulation (QAM) symbol constellation, and the second set of one or more values are values of a lower order phase shift keying (PSK) symbol constellation.

* * * * *